United States Patent
Bortok et al.

(10) Patent No.: US 12,323,315 B2
(45) Date of Patent: Jun. 3, 2025

(54) METHODS, SYSTEMS, AND COMPUTER READABLE MEDIA FOR SCALING NETWORK TRAFFIC AND EMULATING A STATEFUL TRANSPORT LAYER PROTOCOL

(71) Applicant: Keysight Technologies, Inc., Santa Rosa, CA (US)

(72) Inventors: Alexander Bortok, Mountain View, CA (US); Thomas Ameling, Woodland Hills, CA (US); Razvan Ionut Stan, Agoura Hills, CA (US); Sahil Gupta, Rochester, NY (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 393 days.

(21) Appl. No.: 18/105,692

(22) Filed: Feb. 3, 2023

(65) Prior Publication Data
US 2024/0171495 A1    May 23, 2024

Related U.S. Application Data

(60) Provisional application No. 63/426,728, filed on Nov. 19, 2022.

(51) Int. Cl.
*H04L 43/50* (2022.01)
*H04L 41/14* (2022.01)

(52) U.S. Cl.
CPC ............ *H04L 43/50* (2013.01); *H04L 41/145* (2013.01)

(58) Field of Classification Search
CPC .............................. H04L 43/50; H04L 41/145
See application file for complete search history.

(56) References Cited

U.S. PATENT DOCUMENTS

| | | |
|---|---|---|
| 9,582,620 B1 | 2/2017 | Segal et al. |
| 10,225,381 B1 | 3/2019 | Bosshart |
| 10,599,657 B1* | 3/2020 | Balogh ............... G06F 16/2458 |
| 11,093,376 B2 | 8/2021 | Sommers et al. |
| 2008/0198742 A1 | 8/2008 | Kaempfer |
| 2011/0145649 A1 | 6/2011 | Nilsson et al. |
| 2017/0322873 A1 | 11/2017 | Morris |
| 2018/0176020 A1* | 6/2018 | Mukhopadhyay ...... H04L 9/302 |

(Continued)

FOREIGN PATENT DOCUMENTS

| | | |
|---|---|---|
| DE | 102020114730 A1 | 12/2020 |
| GB | 2588837 A | 5/2021 |

OTHER PUBLICATIONS

Kundel, et al., "PASTA: High Performance Packet Timestamping with Programmable Packet Processors", IEEE/IFIP Network Operations and Management Symposium, pp. 1-9 (2020).

(Continued)

*Primary Examiner* — Michael A Keller

(57) ABSTRACT

A method for scaling network traffic includes, at a programmable switching ASIC, receiving n traffic flows from at least one external traffic generator, n being an integer. The method further includes generating, by the programmable switching ASIC and using information from packets in the n traffic flows, m traffic flows, where m is an integer greater than n. The method further includes transmitting, by the programmable switching ASIC, the m traffic flows to a flow destination via device under test.

12 Claims, 7 Drawing Sheets

(56) References Cited

U.S. PATENT DOCUMENTS

| | | | |
|---|---|---|---|
| 2018/0210823 A1 | 7/2018 | Vorganti | |
| 2021/0328902 A1 | 10/2021 | Huselton et al. | |
| 2023/0199531 A1* | 6/2023 | Cummings | G06F 3/0484 |
| | | | 455/418 |
| 2024/0345164 A1* | 10/2024 | Kung | G01R 31/31723 |

OTHER PUBLICATIONS

Zhou, et al., "HyperTester: High-performance Network Testing Driven by Programmable Switches", CoNEXT, pp. 1-14 (2019).

Xi, et al., "SIGCOMM: U: High-Performance Flexible Packet Generator Using Programmable Switching ASIC", Proceedings of the ACM SIGCOMM 2019 Conference Posters and Demos, pp. 1-5 (2019).

"Dynamic Test-Based P4 Packet Blaster Hardware Configuration", IP.com, Pub. Id. IPCOM000257013D (Jan. 10, 2019).

Examination Report under Section 18(3) for Great Britain Application Serial No. GB2009118.7 (Aug. 19, 2021).

Applicant-Initiated Interview Summary for U.S. Appl. No. 16/446,318 (May 28, 2021).

Notice of Allowance and Fee(s) Due for U.S. Appl. No. 16/446,318 (May 26, 2021).

Combined Search and Examination Report under Sections 17 & 18(3) for Great Britain Application Serial No. GB2009118.7 (Mar. 8, 2021).

Keysight Test Automation Platform—Keysight Technologies, Inc. (2017).

Non-Final Office Action for U.S. Appl. No. 16/446,318 (Feb. 4, 2021).

Zhang et al., "HyperVDP: High-Performance Virtualization of the Programmable Data Plane," IEEE Journal on Selected Areas in Communications, vol. 37, No. 3, pp. 556-569 (Mar. 2019).

"Dynamic Test-Based P4 Packet Blaster Hardware Configuration," IPCOM000257013D, pp. 1-6 (Jan. 10, 2019).

Bradner et al., "Benchmarking Methodology for Network Interconnect Devices," RFC 2544, pp. 1-31 (Mar. 1999).

Ginoza, "Request for Comments Summary RFC Nos. 2800-2899," RFC 2899, pp. 1-22 (May 2001).

P4lang / switch, https://github.com/p4lang/switch, pp. 1-4 (Copyright 2019).

Papneja et al., "Basic BGP Convergence Benchmarking Methodology for Data-Plane Convergence," RFC 7747, pp. 1-35 (Apr. 2016).

\* cited by examiner

METHODS, SYSTEMS, AND COMPUTER READABLE MEDIA FOR SCALING NETWORK TRAFFIC AND EMULATING A STATEFUL TRANSPORT LAYER PROTOCOL

PRIORITY CLAIM

This application claims the priority benefit of Provisional Patent Application Ser. No. 63/426,728 entitled "METHODS, SYSTEMS, AND COMPUTER READABLE MEDIA FOR TEST TRAFFIC AMPLIFICATION AND GENERATING RETRANSMISSIONS USING PROGRAMMABLE SWITCHING APPLICATION SPECIFIC INTEGRATED CIRCUIT (ASIC)," filed on Nov. 19, 2022, the disclosure of which is incorporated herein by reference in its entirety.

TECHNICAL FIELD

The subject matter described herein relates to testing a device under test. More specifically, the subject matter relates to methods, systems, and computer readable media for scaling network traffic and emulating a stateful transport layer protocol, including packet retransmissions.

BACKGROUND

Data center environments or large-scale computing environments require testing to identify areas of underperformance or security vulnerabilities. Performance failures and security risks can result from a high volume of traffic to the computing environments. However, testing systems do not generate enough traffic to adequately test these environments. Also, many testing systems generate packets that are identical and fail to test the environments with various types of traffic.

Generally within these environments are also devices that pass communications to other computers such as routers, firewalls, and switches, that also require testing, specifically how the devices pass packets for connection establishment and connection teardown in stateful transport layer protocol. However, testing systems do not have the capability of resending dropped packets and, therefore, are unable to test the devices in a realistic environment.

SUMMARY

Methods, systems, and computer readable media for scaling network traffic and for emulating a stateful transport layer protocol, including packet retransmissions, in a programmable switching application-specific integrated circuit (ASIC) are disclosed. An example method for scaling network traffic includes, at a programmable switching ASIC, receiving n traffic flows from at least one external traffic generator, n being an integer. The method further includes generating, by the programmable switching ASIC and using information from packets in the n traffic flows, m traffic flows, where m is an integer greater than n. The method further includes transmitting, by the programmable switching ASIC, the m traffic flows to a flow destination via a device under test (DUT) or a system under test (SUT).

An example system for scaling network traffic includes a programmable switching ASIC configured for receiving, at the programmable switching ASIC, n traffic flows from at least one external traffic generator, n being an integer. The programmable switching ASIC is further configured for generating, using information from packets in the n traffic flows, m traffic flows, where m is an integer greater than n. The programmable switching ASIC is further configured for transmitting, by the programmable switching ASIC, the m traffic flows to a flow destination via a DUT or an SUT.

An example method for emulating a stateful transport layer protocol, including packet retransmissions, in a programmable includes emulating a stateful transport layer client on a first port of a programmable switching ASIC. The method further includes transmitting packets from the emulated stateful transport layer client to a DUT to establish a plurality of stateful transport layer protocol connections. The method further includes storing, at the programmable switching ASIC, packet content information of each of the transmitted packets. The method further includes detecting, by the emulated transport layer client and using a current time and a transmission time for one of the packets, a packet timeout event for the one packet. In response to detecting the packet timeout event for the one packet, a packet generator implemented in the programmable switching ASIC generates, using the stored packet content information for the one packet, a copy of the one packet for emulating a stateful transport layer retransmission of the one packet. The method further includes transmitting, by the emulated transport layer client, the copy of the one packet to emulate the stateful transport layer retransmission of the one packet.

An example system for emulating a stateful transport layer protocol, including packet retransmissions, includes a programmable switching application-specific integrated circuit (ASIC) configured for emulating a stateful transport layer client on a first port of a programmable switching ASIC. The programmable switching ASIC is further configured for transmitting packets from the emulated stateful transport layer client to a DUT to establish a plurality of stateful transport layer protocol connections. The programmable switching ASIC is further configured for storing packet content information of each of the transmitted packets. The programmable switching ASIC is further configured for detecting, by the emulated transport layer client and using a transmission time for one of the packets, a packet timeout event for the one packet. In response to detecting the packet timeout event for the one packet, a packet generator implemented in the programmable switching ASIC generates, using the stored packet content information for the one packet, a copy of the one packet for emulating a stateful transport layer retransmission of the one packet. The programmable switching ASIC is further configured for transmitting, by the emulated transport layer client, the copy of the one packet to emulate the stateful transport layer retransmission of the one packet.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

BRIEF DESCRIPTION OF THE DRAWINGS

The subject matter described herein will now be explained with reference to the accompanying drawings of which.

DETAILED DESCRIPTION

Figure 1:
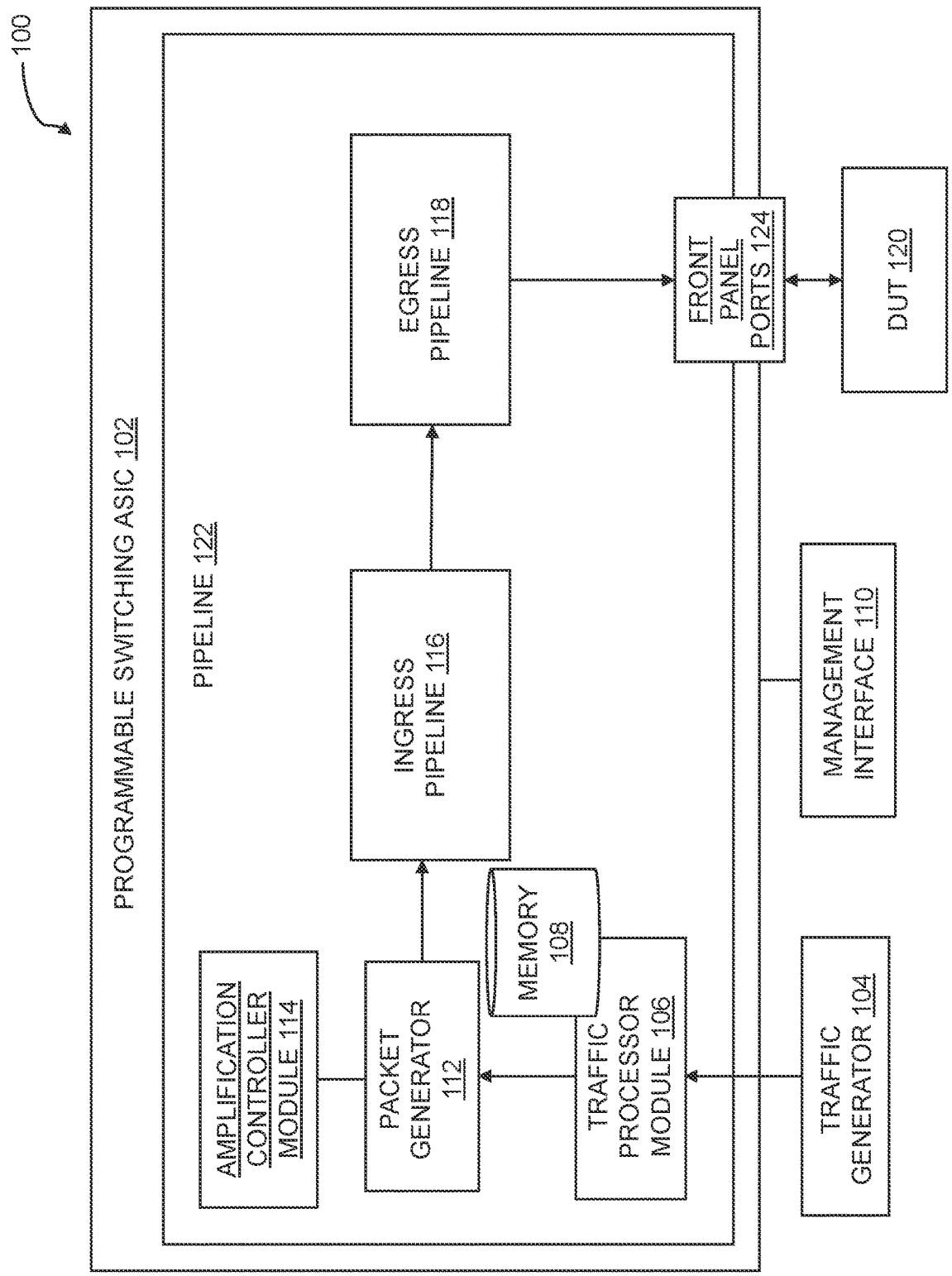
FIG. 1 is a block diagram illustrating an example system for scaling network traffic according to an embodiment of the presently disclosed subject matter.

The subject matter described herein includes methods, systems, and computer readable media for scaling network traffic and for emulating a stateful transport layer protocol, including packet retransmissions, in a programmable switching application-specific integrated circuit (ASIC). A programmable switching ASIC may amplify traffic flows received from an external traffic generator. By "amplify traffic flows", it is meant that the programmable switching ASIC increases the number of traffic flows that are received from the external traffic generator, e.g., for stress testing a device under test. The programmable switching ASIC may receive the traffic from the external traffic generator and selectively pass through or amplify packets in the traffic. By "amplifying packets", it is meant that the programmable switching ASIC increases the number of packets from those received from the external traffic generator. The programmable switching ASIC may amplify selected packets using an internal packet generator to generate packet templates of the selected packets. A packet template is a portion of a packet that is prepopulated with some but not all packet header fields. The programmable switching ASIC creates packets to be transmitted by filling in additional packet content information (i.e., ensuring that all required packet header fields are populated) before transmitting the packets. The packet content information in a particular packet may be selected based on a test device port that is transmitting the packets. For example, test device ports may be configured to amplify and transmit different traffic flows to a DUT. The content of the packets transmitted on a particular port to the DUT may include content specific to the flow(s) associated with that port, such as source IP address, source port, destination IP address, and destination port. The programmable switching ASIC may include multiple pipelines each able to run a plurality of packet generator applications to produce a mix of traffic.

In another embodiments, a programmable switching ASIC may emulate a stateful transport layer protocol by receiving an initial packet from a traffic generator, such as a synchronization (SYN) packet to initiate a connection-oriented protocol (COP), for example a Transmission Control Protocol (TCP) 3-way handshake. The programmable switching ASIC may use an internal packet generator to generate copies of the received initial packet and distribute the packets to front panel ports that will emulate COP clients, such as TCP clients, for testing a DUT. The programmable switching ASIC may mark the packets each with a concurrent connection number for identification and transmit the packets to a device under test via the client-emulating front panel ports. If the device under test is a switch or a router that is connected to other front panel ports of the test device that emulate COP servers such as TCP servers, the device under test may switch or route the packets to the front panel ports of the test device that emulate servers. The programmable switching ASIC may transform each SYN packet to a SYN/Acknowledge (SYN/ACK) packet and return the packets from the server front panel ports to the corresponding client front panel ports via the device under test. The programmable switching ASIC may then transform each SYN/ACK packet to an ACK packet and transmit the packets from the original client front panel ports to the corresponding server front panel ports.

The programmable switching ASIC may also generate using the packet generator packet templates according to the packets transmitted by front panel ports as replacement or backup packets for retransmission when packets are dropped. The programmable switching ASIC may detect a packet is dropped if the difference between a current time and a saved transmit timestamp of a packet exceeds a threshold. When a packet is dropped, the programmable switching ASIC may input packet content information of the dropped packet into the corresponding packet template and send the new packet as a retransmission.

FIG. 1 is a diagram illustrating an example system 100 for scaling network traffic. System 100 includes a programmable switching Application-Specific Integrated Circuit (ASIC) 102. Programmable switching ASIC 102 may include a P4 programmable switching ASIC, such as the Tofino™ programmable switching ASIC available from Intel Corporation. Programmable switching ASIC 102 may run a P4 application. P4 is a programming language, usable for programming the data plane (e.g., data packet processing) of programmable switching ASIC 102. The P4 language is designed to be implementation-independent or target-independent, protocol independent, and field reconfigurable. For example, P4 source code can be compiled for many different types of targets, has no native support for network protocols, and allows operators to change the way a target (e.g., a central processing unit (CPU), a network processor, a field programmable gate array (FPGA), or an application-specific integrated circuit (ASIC)) processes packets after deployment.

Programmable switching ASIC 102 is configured for receiving n traffic flows from at least one traffic generator 104, n being an integer. The n traffic flows may be generated by at least one traffic generator 104. Traffic generator 104 may be an external traffic generator connected to programmable switching ASIC 102. Then traffic flows may include a mix of emulated application traffic. In some embodiments, traffic generator 104 may generate traffic for a plurality of applications and/or traffic that mimics security attacks. Mimicked security attacks may include, for example, a denial of service attack caused by flooding a device under test (DUT) 120 with traffic. Traffic generator 104 may include printed circuit boards with field programmable gate arrays (FPGAs) and network processors. Traffic generator 104 may be configured for simulating network applications and network security threats by generating and transmitting layer 4 through layer 7 traffic to programmable switching ASIC 102. In some embodiments, the FPGAs in traffic generator 104 may generate and send layer 2 and layer 3 background traffic to programmable switching ASIC 102. Traffic generator 104 may emulate applications that send and receive SSL traffic, sending secure sockets layer (SSL) traffic to programmable switching ASIC 102.

In some embodiments, traffic generator 104 may include a computing device, such as a client or server, that communicates with DUT 120 using "real", rather than simulated, traffic. A computing device may include, without limitation a microcontroller, microprocessor, digital signal processor (DSP) and/or system on a chip (SoC) as described herein. A computing device may include, be included in, and/or communicate with a mobile device such as a mobile telephone or smartphone. A computing device may include a single computing device operating independently, or may include two or more computing device operating in concert, in parallel, sequentially or the like; two or more computing devices may be included together in a single computing device or in two or more computing devices.

Programmable switching ASIC 102 may include one or more pipelines 122 each configured for receiving traffic from traffic generator 104 and amplifying the traffic. Programmable switching ASIC 102 may include one, two, three, four or more pipelines 122. Each pipeline 122 may include a packet generator 112, as discussed herein, configured for generating traffic for one or more applications. In some embodiments, each pipeline 122 may generate up to eight simultaneous applications and transmit the amplified traffic through multiple front panel ports 124. Each pipeline 122 may be connected to, for example, 64 front panel ports 124 through which to transmit the amplified traffic.

Programmable switching ASIC 102 uses information from packets in n traffic flows received from traffic generator 104 to generate m traffic flows, where m is an integer greater than n. For example, programmable switching ASIC 102 may copy payloads of packets in the n traffic flows and generate packets for the m traffic flows using the packet payloads copied from the packets in the n traffic flows. Programmable switching ASIC 102 may generate the m traffic flows to include a mix of emulated application traffic included in the n traffic flows. For example, traffic may include emulated traffic from a plurality of sources for different application types. For example, the emulated traffic may include emulated web browsing traffic, emulated social media application traffic, emulated VoIP traffic, etc. Rather than requiring traffic generator 104 to generate the number of application flows that are desired to be sent to DUT 120, which would require significant processing resources, traffic generator 104 generates a smaller number of flows that are ultimately transmitted to DUT 120, and programmable ASIC 102 amplifies the flows to increase the number of flows transmitted to DUT 120. To generate the amplified flows, programmable switching ASIC 102 may continually monitor and store payloads and destination information for the n traffic flows and use the continually updated payload and destination information for generating the m traffic flows. In some embodiments, programmable switching ASIC 102 may periodically select and save one or more packets from n traffic flows to copy for traffic amplification.

Programmable switching ASIC 102 may be communicatively connected to traffic generator 104 via a physical connection such as, for example, an ethernet interface. Programmable switching ASIC 102 may include a traffic processor module 106 configured to receive traffic, including n traffic flows, from traffic generator 104. Traffic processor module 106 may be configured for parsing packets in the received traffic, which may be based on parameters such as the type of data and/or or headers in the packets. For example, programmable switching ASIC 102 may pass through some packets of the received traffic without copying them, while amplifying other packets that contain a certain type of data or headers, such as data requesting images from a server and/or headers identifying a certain source port or destination port. In some embodiments, traffic processor module 106 may be external and connected to programmable switching ASIC 102.

Programmable switching ASIC 102 may include a memory 108. Memory 108 may comprise random access memory (RAM), flash memory, a magnetic disk storage drive, and the like. Programmable switching ASIC 102 may save traffic received from traffic generator 104 in memory 108. In some embodiments, all traffic received from traffic generator 104 may be saved to memory 108. In other embodiments, programmable switching ASIC 102 may save in memory 108 only packets of the received traffic that are selected for amplification.

Programmable switching ASIC 102 may include or be externally connected to a management interface 110 configured for receiving user input determining how programmable switching ASIC 102 processes traffic received from traffic generator 104. For example, management interface 110 may receive parameters defining which type of traffic from traffic generator 104 to amplify. Traffic processor module 106 may parse traffic from traffic generator 104 based on the parameters received from management interface 110.

Programmable switching ASIC 102 may include a packet generator 112, such as pktgen, configured for generating packet templates. pktgen is an open source packet generator available at https://github.com/Pktgen. The subject matter described herein is not limited to using pktgen to generate packet templates. Any suitable packet generator may be used without departing from the scope of the subject matter described herein. The term "packet template", as used herein, includes a portion of a packet, such as a TCP datagram, with prepopulated payloads.

Traffic processor module 106 may send the packets it selects to packet generator 112. Packet generator 112 may generate packet templates of a specific length or size. Packet generator 112 may include data in packet templates based on data in the packets selected by traffic processor module 106. Traffic processor module 106 may further parse packets selected for amplification, determining which of the selected packets will be sent to which pipeline 122 and sending packets to the corresponding packet generator 112 of that pipeline 122.

In some embodiments, traffic processor module 106 may send a packet to a plurality of pipelines 122, for example, if the traffic processor module 106 has selected the packet for significant amplification. Traffic processor module 106 may identify for the pipelines 122 which packets are to be amplified and which packets and to simply be passed through. In some embodiments, programmable switching ASIC 102 may create a log of the packets selected for amplification and/or the corresponding packet templates generated. The log may be accessible via management interface 110. In some embodiments, only the selected packets are stored in memory 108. Programmable switching ASIC 102 may report the packets selected for amplification and/or the corresponding packet templates generated by packet generator 112 to an administrative subsystem, remote database, or communicatively connected computing device.

In some embodiments, packet generator 112 may generate packet templates for each packet received by traffic processor module 106 that the traffic processor module 106 selected for amplification. Each pipeline 122 in programmable switching ASIC 102 may be configured for generating and transmitting packets for emulating a plurality of applications corresponding to those represented by packets received from traffic generator 104. In some embodiments, each pipeline 122 may send packets associated with up to eight packet generator applications simultaneously. The packet generator application may control when packet generation should begin and which packets should be copied. The packet generator application may further control which ports transmit the packets. Packet generator 112 may generate copies of a packet to be transmitted by a plurality of front panel ports 124 connected to pipeline 122. Each packet generator application may be triggered by an event, which begins the generation of packets. Packet generator application may be triggered by a one-time timer that triggers a single time, a periodic timer that triggers periodically, a port down trigger that triggers when a port goes down, or a recirculation pattern trigger that triggers when a packet is recirculated and the first bits, such as the first 32 bits, of the packet match a value configured against the application. Packet generator application may control the length, or the total number of bytes, in each packet. Each packet generator application may send a unique packet template.

Each pipeline 122 may include a packet buffer configured for temporarily storing packets to support orderly transmission without packets being discarded. Packet generator 112 may include a periodic timer and may generate a packet template at a specified rate or packet length using the periodic timer. In some embodiments, programmable switching ASIC 102 may not include packet generator 112, but instead a packet generator 112 may be connected to the programmable switching ASIC 102 by a physical port. Packet generator 112 in each pipeline 122 may send packet templates at configurable rates. In some embodiments, packet generator 112 in each pipeline 122 can send an aggregate of up to 100 Gigahertz across all packet generator applications. Programmable switching ASIC 102 may include an amplification controller module 114 configured for controlling packet generator 112. Amplification controller module 114 may receive parameters from management interface 110. Amplification controller module 114 may identify for packet generator 112 the packets from which to base packet templates. Amplification controller module 114 may set a frequency at which packet generator 112 generates packet templates and an amount of packet templates for the packet generator 112 to generate based on the desired amplification of traffic. In some embodiments, amplification controller module 114 may control packet generator 112 to generate distinct amounts of packet templates corresponding to different packets among the packets selected for amplification wherein packet generator 112 generates different amounts of packet templates for different selected packets.

Each pipeline 122 may include an ingress pipeline 116 with a plurality of input ports and an egress pipeline 118 with a plurality of output ports connected to front panel ports 124. Programmable switching ASIC 102 may further include at least an internal port. Packet generator 112 may send packet templates through one or more internal ports of programmable switching ASIC 102 to the input ports on ingress pipeline 116. Each pipeline 122 may include a plurality of output ports, such as 8, 16, 32, 64, or more output ports connected to corresponding front panel ports 124. Programmable switching ASIC 102 may insert headers and/or instrumentation such as timestamp information in packet templates. Programmable switching ASIC 102 may then send the packets, which were packet templates, from ingress pipeline 116 to egress pipeline 118. Programmable switching ASIC 102 may insert configured protocol headers in the packets based on the output port the packets are on and/or the process group identifiers (PGID) of the packets. Programmable switching ASIC 102 may modify the packets on each output port to insert stateful and per-PGID values in header fields of the packets.

System 100 may then transmit the packets from one or more front panel ports 124 connected to programmable switching ASIC 102 to DUT 120. DUT 120 may be any computing device under test including, without limitation, a router, firewall, switch, or server. The n traffic flows may collectively consume a first bandwidth and the m traffic flows may collectively consume a second bandwidth, wherein the second bandwidth is greater than the first bandwidth. In some embodiments, the second bandwidth may be 1000 times larger than the first bandwidth. In some embodiments, the second bandwidth may be, for example, 200 Gigabits per second (Gbps) 300 Gbps, 400 Gbps, or more. Programmable switching ASIC 102 transmits the m traffic flows to a flow destination via DUT 120. Programmable switching ASIC 102 may transmit at least some of the m traffic flows to flow destinations of the n traffic flows. For example, DUT 120 may also be connected to one or more other computing device that are the destination and the DUT 120 may route packets to these computing devices.

Figure 2:
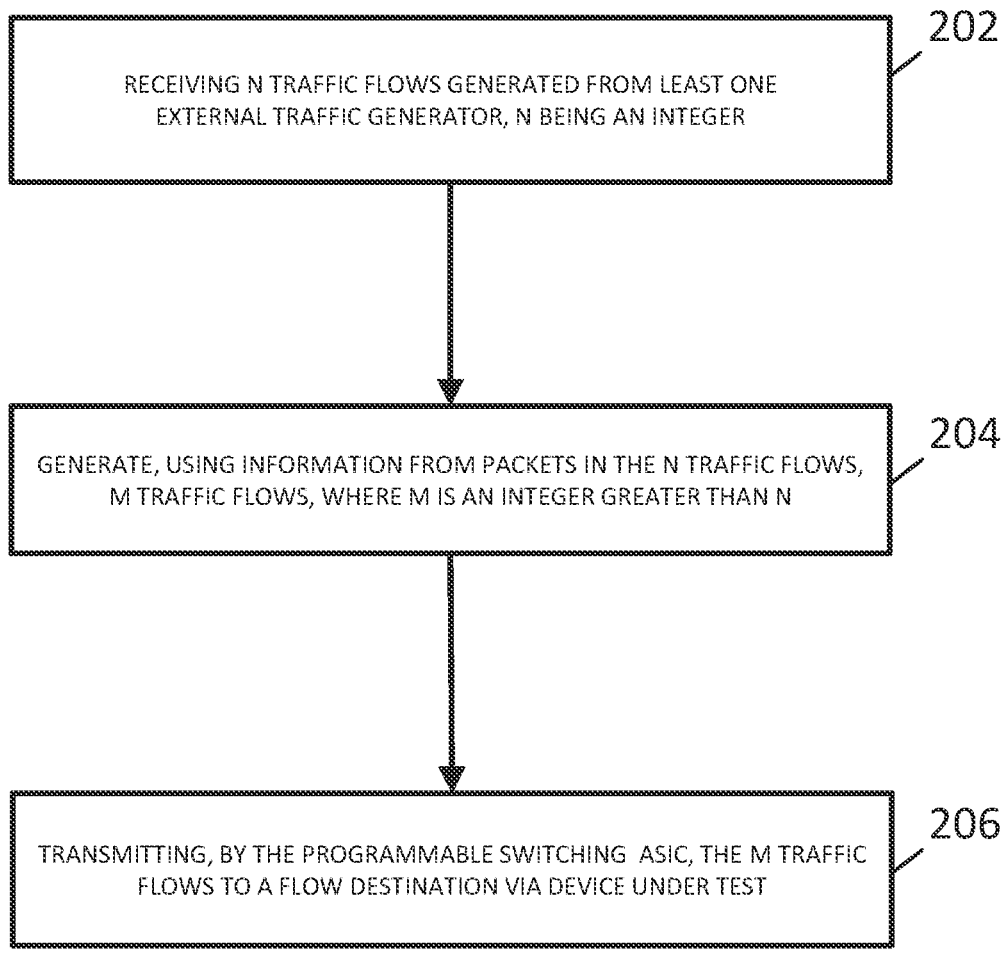
FIG. 2 is a flow diagram illustrating an example method for scaling network traffic according to an embodiment of the presently disclosed subject matter.

FIG. 2 is a flow diagram illustrating an example method 200 for scaling network traffic. At step 202, a programmable switching application specific integrated circuit (ASIC) receives n traffic flows from at least one traffic generator, n being an integer. Then traffic flows may include a mix of emulated application traffic. The n traffic flows may include emulated security attack traffic.

At step 204, the programmable switching ASIC generates, using information from packets in the n traffic flows, m traffic flows, where m is an integer greater than n. The m traffic flows may include the mix of emulated application traffic and/or emulated security attack traffic from the n traffic flows. Generating the m traffic flows may include copying payloads of packets in the n traffic flows and generating packets for the m traffic flows using the packet payloads copied from the packets in the n traffic flows. Generating the m traffic flows may include initiating m handshake transactions with a DUT or SUT. In one exemplary embodiment, the m handshake transactions are intended to emulate m stateful connections between the test system and a device under test (DUT) or system under test (SUT). The m handshake transactions may include establishing m connection-oriented protocol (COP) connections, for example TCP or SCTP connections. The programmable switching ASIC may continually monitor and store payloads and destination information for the n traffic flows and generate the m traffic flows using the continually updated payload and destination information. The n traffic flows may collectively consume a first bandwidth and the m traffic flows may collectively consume a second bandwidth, wherein the second bandwidth is greater than the first bandwidth.

At step 206, the programmable switching ASIC transmits the m traffic flows to a flow destination via the DUT or the SUT. The programmable switching ASIC may transmit at least some of the m traffic flows to flow destinations of the n traffic flows.

Emulating Stateful Transport Layer Protocol Retransmissions

Figure 3:
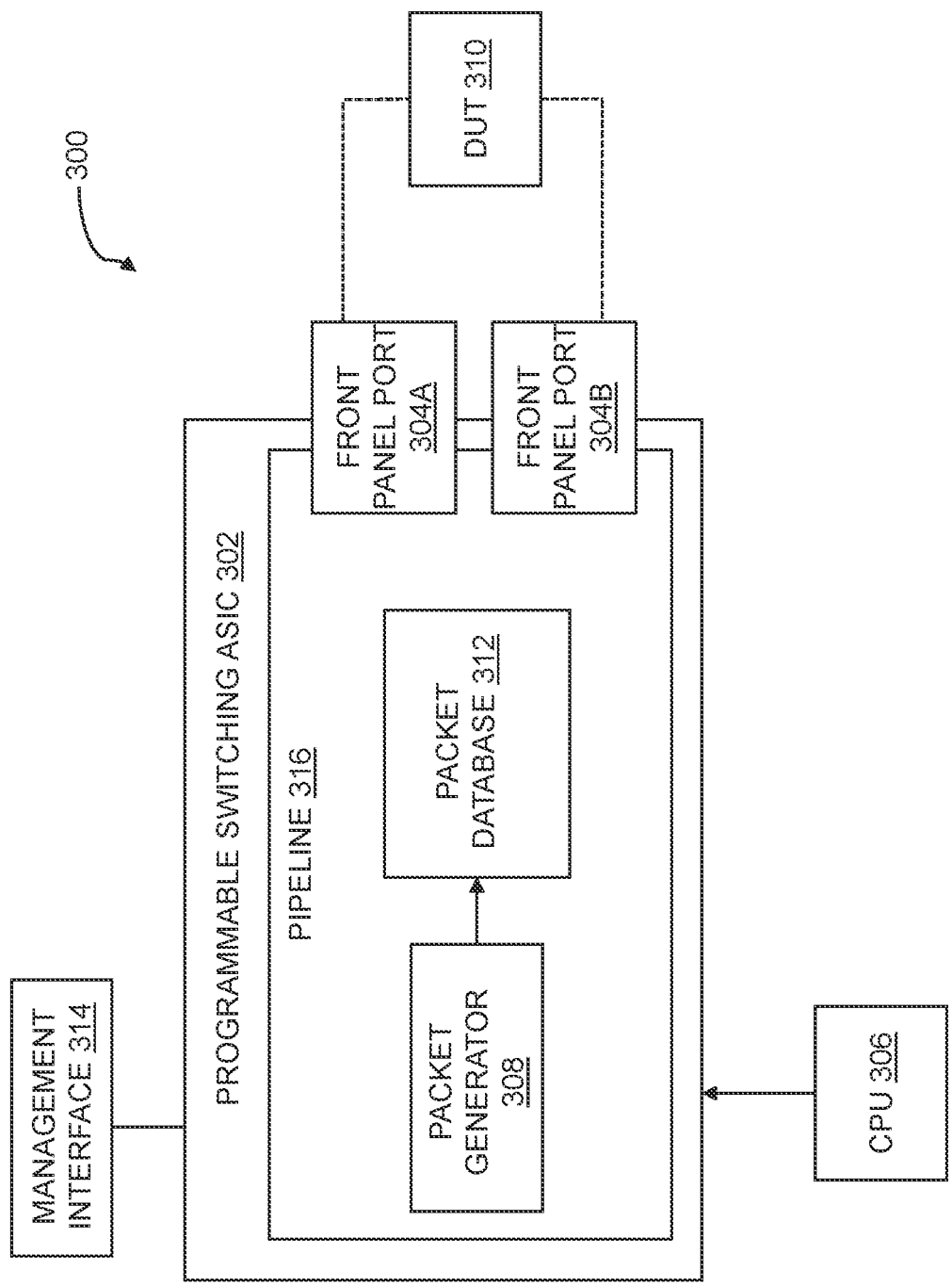
FIG. 3 is a block diagram of an example system for emulating a stateful transport layer protocol, including packet retransmissions, according to an embodiment of the presently disclosed subject matter.

Some packet generators used to test network devices simply blast packets or connections to a DUT. While such tests are useful, they do not present the DUT with a realistic mix of network traffic. The subject matter described herein generates a more realistic mix of traffic than packet or connection generators by emulating packet retransmissions of a stateful transport layer protocol such as a connection-oriented protocol (COP), for example TCP or SCTP. FIG. 3 is a block diagram of an example system 300 for emulating a stateful transport layer protocol, including packet retransmissions. System 300 includes a programmable switching application-specific integrated circuit (ASIC) 302. Programmable switching ASIC 302 may include a P4 programmable switching ASIC, such as the Tofino™ programmable switching ASIC available from Intel Corporation. Programmable switching ASIC 302 may be configured for emulating a stateful transport layer client on a first port of the programmable switching ASIC 302. Programmable switching ASIC 302 may also be configured for emulating a stateful transport layer server on a second port of the programmable switching ASIC 302. Programmable switching ASIC 302 may be configured for emulating a stateful connection between two endpoints, such as a client computing device and a server computing device, which are also referred to as client and server, respectively.

Programmable switching ASIC 302 may emulate connection establishment, communication during an established connection, and/or teardown of a connection for a transport layer protocol such as COP, for example without limitation transmission control protocol (TCP) or stream control transmission protocol (SCTP). For example, the emulated stateful transport layer client and the emulated stateful transport layer server may include emulated TCP client and emulated TCP server, respectively. Programmable switching ASIC 302 may include a plurality of front panel ports 304 for transmitting and receiving packets. Programmable switching ASIC 302 may be configured for testing devices that pass along traffic such as switches, routers, firewalls, and the like and for testing devices that are the intended recipient of traffic such as servers. For testing devices that pass along traffic, front panel ports 304 may be paired, wherein programmable switching ASIC 302 emulates the TCP client on one of the paired front panel ports 304, such as a first front panel port 304a, and the TCP server on the other of paired front panel ports 304, such as a second front panel port 304b. In some embodiments, odd ports of front panel ports 304, such as front panel ports 1, 3, 5, and so on, may emulate TCP clients and even ports of the front panel ports 304, such as front panel ports 2, 4, 6, and so on, may emulate TCP servers. Paired front panel ports 304 may be physically connected by a fiber optic cable. In some embodiments, programmable switching ASIC 302 may include 32 front panel ports 32 forming 16 pairs. Paired front panel ports 304 may also be logically paired. When testing devices that are the intended recipient of traffic, such as an HTTP server, programmable switching ASIC 302 may not pair front panel ports 304 or emulate a TCP server on any of the ports such as front panel port 304b.

Figure 4:
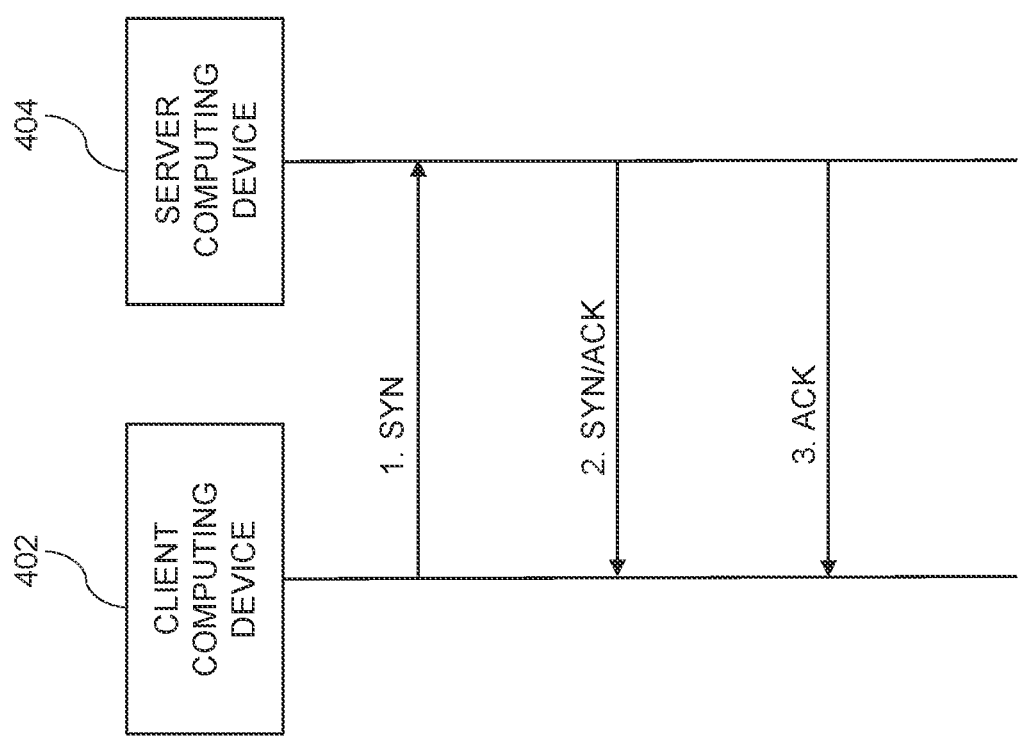
FIG. 4 is a message flow diagram illustrating a TCP connection establishment using a 3-way handshake.

Programmable switching ASIC 302 may emulate a 3-way handshake between emulated TCP client and emulated TCP server. When two hosts, such as a client computing device and a server computing device, communicate using TCP, a connection is established before data can be exchanged. FIG. 4 is a message flow diagram illustrating a standard TCP connection establishment using a 3-way handshake. In line 1, a client computing device 402 sends a synchronize (SYN) packet to a server computing device 404, initiating a connection establishment for a client-to-server communication session with server computing device 404. The SYN message may include an initial sequence (SEQ) number from client computing device 402, such as x. The initial SEQ number may be a randomly selected number and each subsequent SEQ number from client computing device 402 may increase each transmission by the amount of bytes the client computing device 402 has sent in this communication session.

In line 2, server computing device 404 responds by sending client computing device 402 a synchronize/acknowledge (SYN/ACK) packet acknowledging the client-to-server communication session and requesting a server-to-client communication session with the client computing device 402. The ACK part of the packet may include an acknowledgement (ACK) number, which is the sequence number of client computing device 402 incremented with 1, such as x+1. The SYN part of the packet may include an initial SEQ number from server computing device 404, such as y. Similar to the SEQ numbers of client computing device 402, the SEQ numbers of sever computing device 404 track the total amount of bytes sent by the server computing device 404 in this communication session, with the initial SEQ number being a randomly selected number and subsequent SEQ numbers increasing by the total amount of bytes sent by the server computing device 404.

In line 3, client computing device 402 sends an ACK packet to server computing device 404 acknowledging the server-to-client communication session. The ACK message may include an ACK number, which is the sequence number of server computing device 404 incremented with 1, such as y+1.

Referring again to FIG. 3, programmable switching ASIC 302 may transmit emulated TCP 3-way handshake packets between the TCP client and the TCP server. System 300 may include a central processing unit (CPU) 306 configured for generating an initial packet. Initial packet may include a SYN packet to emulate the beginning of a connection establishment, a FIN packet to emulate the beginning of a teardown connection, or a packet to emulate communication during an established communication session such as a packet requesting data from server. In some embodiments, CPU 306 may include a switch CPU. CPU 306 may include a traffic generator, such as the open source packet manipulation program SCAPY which may be used for generating traffic. When system 300 emulates a TCP connection establishment, CPU 306 may generate the initial SYN packet and send the initial packet to programmable switching ASIC 302. CPU 306 may be physically connected to programmable switching ASIC 302 via a CPU port on the programmable switching ASIC 302 such as a devlink port. System 300 may generate copies of the initial SYN packet and programmable switching ASIC 302 may distribute the initial SYN packet to at least one of front panel ports 304 emulating a client port, such as front panel port 304a. In some embodiments, CPU 306 may generate the copies of the initial SYN packet and send them to programmable switching ASIC 302.

In some embodiments, programmable switching ASIC 302 may generate the copies of the initial SYN packet.

Copies of the initial SYN packet may also be referred to as concurrent connection SYN packets because of the connections they will each establish concurrently. Programmable switching ASIC 302 may include a packet generator 308, such as pktgen, configured for generating packets. Packet generator 308 may receive the initial SYN packet and generate packets based on the initial SYN packet. In some embodiments, packet generator 308 may generate copies of the initial SYN packet and send the concurrent connection SYN packets to front panel ports 304 emulating a client port via a packet generator port.

Packet generator 308 may include a packet buffer. The packet definition may be configured from the control plane REST API server in the packet buffer. Packet generator 308 may include a 48-bit pktgen header in the generated packets before the packets are defined from REST API server. Fields in the pktgen header may include application ID, batch, ID, and packet ID. Programmable switching ASIC 302 may include in the concurrent connection SYN packets a unique concurrent connection number. In some embodiments, the concurrent connection number may be the packet ID of the generated packet. Programmable switching ASIC 302 may encode the concurrent connection number in the TCP options field or any field not used by a DUT 310 described herein. Each of front panel ports 304 may emulate distinct media access control (MAC) addresses and/or IP addresses. Programmable switching ASIC 302 may add information to fields in the SYN packets, which may be based on which port of the front panel ports 304 is transmitting the SYN packet and which port of the front panel ports 304 is receiving the SYN packet, including the MAC address field, IP field, and the TCP header. Programmable switching ASIC 302 may include a fiber distribution terminal (FDT) and use the FDT to distribute the packets to front panel ports 304.

Similar to programmable switching ASIC 102 shown in FIG. 1, programmable switching ASIC 302 may include a plurality of pipelines 316. Programmable switching ASIC 302 may include two, three, four, or more pipelines 316. Each pipeline 316 may include packet generator 308 and a plurality of output ports connected to corresponding front panel ports 304 such as 32 front panel ports 304. Each pipeline 316 may include an ingress pipeline configured to receive packet templates from packet generator 308 in the pipeline 316 and an egress pipeline configured to transmit packets from front panel ports 304 connected to the pipeline 316.

Programmable switching ASIC 302 transmits packets to establish a plurality of stateful transport layer protocol connections between the emulated stateful transport layer client, such as front panel port 304a, and the emulated stateful transport layer server, such as front panel port 304b, through a DUT 310. DUT 310 may include a computing device configured for passing packets such as a switch, firewall, router, and the like. Front panel ports 304 emulating a client, such as front panel port 304a, may each be physically connected to their corresponding paired front panel ports 304 emulating a server, such as front panel port 304b, through DUT 310. For example, front panel port 304a may be connected to DUT 310 by a cable and the DUT 310 may be connected to front panel port 304b by a cable, allowing packets to pass between the front panel port 304a and the front panel port 304b through the DUT 310.

Programmable switching ASIC 302 stores packet content information of each of the transmitted packets. Programmable switching ASIC 302 may store transmission times of each transmitted packet, which may include transmit timestamps. When packets enter an ingress pipeline of programmable switching ASIC 302, the programmable switching ASIC 302 may generate a transmit timestamp based on a switch clock. When packets are transmitted, programmable switching ASIC 302 may store the packet content information and transmit timestamps in a packet database 312. In some embodiments, each pipeline 316 of programmable switching ASIC 302 may include packet database 312. Packet database 312 may include one or more state tables for storing the current state of packets. Packet database 312 may include at least a P4 stateful register in which programmable switching ASIC 302 may store dynamic or changing fields of packets. Stored packet content information may include source IP address (src IP), destination IP address (dst IP), virtual local area network identification (VLAN ID), TCP state, TCP flag, ACK number, and/or SEQ number. The TCP state may include LISTEN, SYN-SENT, SYN-RECEIVED, ESTABLISHED, FIN-WAIT-1, FIN-WAIT-2, CLOSE-WAIT, CLOSING, LAST-ACK, TIME-WAIT, or CLOSED. The TCP flag may include SYN, ACK, FIN, URG, PSH, RST, ECE, CWR, and/or NS. A transmit timestamp includes the time a packet was transmitted from the programmable switching ASIC 302. In some embodiments, transmission times are timers that begin when the corresponding packets are transmitted and, thus, do not require comparisons to a current time to determine the amount of time passed since the packets were transmitted.

Programmable switching ASIC 302 may transmit the SYN packet from front panel port 304a to front panel port 304b via DUT 310. When front panel port 304b receives the SYN packet, programmable switching ASIC 302 may then convert the SYN packet to a SYN/ACK packet and interchange the source and the destination in MAC fields, IP fields, and TCP fields such as source port and destination port fields in the TCP header of the packet, so the source and the destination identified in the packet now correspond with front panel port 304b emulating a server and front panel port 304a emulating a client, respectively. As part of the conversion from a SYN packet to a SYN/ACK packet, programmable switching ASIC 302 may include in the ACK number and an initial SEQ number from the emulated server. Programmable switching ASIC 302 may then transmit the SYN/ACK packet from front panel port 304b to front panel port 304a via DUT 310.

When front panel port 304a receives the SYN/ACK packet, programmable switching ASIC 302 may then convert the SYN/ACK packet to a ACK packet and again interchange the source and the destination in MAC fields, IP fields, and TCP fields so the source and destination identified in the packet are the same as in the original SYN packet, corresponding with front panel port 304a emulating a client and front panel port 304b emulating a server, respectively. As part of the conversion from a SYN/ACK packet to an ACK packet, programmable switching ASIC 302 may update the ACK number and SEQ number. Programmable switching ASIC 302 may transmit the ACK packet from front panel port 304a to front panel port 304b via DUT 310.

Programmable switching ASIC 302 may include a TCP state machine in packet database 312 configured for performing the transformation of a packet and pushing the transformed packet to an egress pipeline of the same of front panel ports 304 that received the packet. Upon completing each connection cycle, such as the emulated TCP connection establishment described, programmable switching ASIC 302 may increment the source IP so the port of front panel ports 304 emulating a client that transmits a subsequent SYN packet has a source IP distinct from source IPs already used by the programmable switching ASIC 302. Packet database 312 may include a logic configured to rotate the IPs within a ranger per VLAN ID when the source IP increments to a last IP of VLAN range.

Packet generator 308 may be configured to generate packets at line rate. Like packet generator 112 shown in FIG. 1, packet generator 308 may be triggered by an event, by a one-time timer, by a periodic timer that triggers periodically, when a port goes down, or when a packet is recirculated and the first 32 bits of the packet match a value already configured by the packet generator 308. Packet generator 308 may be configured to generate a set number of packets periodically at a determined time interval. In some embodiments, packet generator 308 may periodically generate the same number of packets as the number of concurrent connection SYN packets that programmable switching ASIC 302 initially sent. Programmable switching ASIC 302 may determine the connections per second being made as a performance indicator of DUT 310.

Programmable switching ASIC 302 detects, by the emulated transport layer client or the emulated transport layer server and using a transmission time for one of the packets, a packet timeout event for a packet. Transmission time may be determined by a timer that commences when the packet is transmitted, reflecting the amount of the time elapsed since transmission. Detecting the packet timeout event may include detecting a timeout of a transmitted packet, such as one of the 3-way TCP handshake packets. In some embodiments, programmable switching ASIC 302 may determine a transmission time by storing a transmit timestamp when a packet is transmitted and comparing the transmit timestamp to a current time. Programmable switching ASIC 302 may determine that a transmission time of the packet exceeds a threshold and detect a packet timeout event based on this determination. In some embodiments, programmable switching ASIC 302 may check the transmission time of transmitted packets each time packet generator 308 sends packets. Programmable switching ASIC 302 may review transmission times of packets transmitted to identify any packet timeout event and identify the dropped packet by the stored concurrent connection number associated with the corresponding transmission time. The threshold may be any specified time. In some embodiments, the threshold time is set to a time greater than packet processing latency of DUT 310 between front panel ports 304 to avoid false positives for dropped packets. Programmable switching ASIC 302 may reset the transmission time of a packet once it receives ACK of the message. System 300 may include a management interface 314 with a graphical user interface (GUI) configured to display information for example the number of dropped packets, the total number of connections established, the current number of connections established, the total number of packets transmitted to DUT 310, the amount of packets packet generator 308 generates in a burst, the period of time between each burst of generated packets, and/or the connections per second. Management interface 310 may also be configured to receive user input to set parameters such as the amount of packets packet generator 308 generates in a burst, the period of time between each burst of generated packets, the threshold time, the types of packets to amplify, and/or the degree of traffic amplification.

In response to detecting the packet timeout event for a packet, programmable switching ASIC 302 generates, by packet generator 308 and using the stored packet content information for the packet, a copy of the one packet for emulating a stateful transport layer retransmission of the packet. After programmable switching ASIC 302 transmits packets, packet generator 308 may generate packet templates corresponding to the packets transmitted. For example, packet generator 308 generates SYN packet templates after SYN packets are transmitted and SYN/ACK packet templates after SYN/ACK packets are transmitted. If programmable switching ASIC 302 determines that a packet has dropped, it may input at least a portion of packet content information of the dropped packet into the corresponding packet template. Packet content information may include source ID, destination ID, MAC addresses, TCP fields, concurrent connection number, SEQ number, ACK number if applicable, and/or the like. Then programmable switching ASIC 302 may transmit the packet, which may be now a copy of the dropped packet with the same packet content information, from the same of front panel ports 304 that the dropped packet was sent. In some embodiments, not all packet content information from the dropped packet is added to the packet template. For example, the dropped packet may include a payload that is not included in the packet template. Programmable switching ASIC 302 may store the packet content information and transmit timestamp of the newly transmitted packet in packet database 312. If programmable switching ASIC 302 determines that a transmitted packet has not dropped, then pipeline 316 in programmable switching ASIC 302 may discard the corresponding packet template. In some embodiments, packet generator 308 may generate a packet template once programmable switching ASIC 302 determines a packet timeout event.

It is understood that system 300 may generate and retransmit packets emulating communication during an established connection and/or a teardown connection for Internet Protocol (IP) transport layer protocol in addition to the connection establishment described in detail. For example, programmable switching ASIC 302 may receive from CPU 306 an initial FIN packet to teardown a TCP connection and distribute copies of the FIN packet to front panel ports 304 that are emulating clients. Programmable switching ASIC 302 may generate concurrent connection numbers for the packets and store in packet database 312 packet content information and transmit timestamps of the packets. Programmable switching ASIC 302 may transmit the FIN packet from front panel port 304a emulating a client to front panel port 304b through DUT 310. Programmable switching ASIC 302 may then transform the FIN packet to a FIN/ACK packet and update the information comparable to as described regarding the transformation from a SYN packet to a SYN/ACK packet. Front panel port 304b may send the SYN/ACK packet to front panel port 304a, and Programmable switching ASIC 302 may transform the FIN/ACK packet to an ACK packet and update the packet content information comparable to as described regarding the transformation from a SYN/ACK packet to an ACK packet. Programmable switching ASIC 302 may transmit the ACK packet from front panel port 304a to front panel port 304b via DUT 301. Packet generator 308 may generate packet templates corresponding to packets transmitted and input the information from a dropped packet in the corresponding packet template and transmit the packet from the same of front panel ports 304. Likewise, programmable switching ASIC 302 may receive from CPU 306 an initial packet emulating communication during an TCP communication session, make copies of the packet and transmit the packets from front panel ports 304 emulating clients. Packet generator 308 may generate packet templates of the packets transmitted and input the information from a dropped packet in the corresponding packet template including any data in the dropped packet, such as a request to view an image.

Figure 5:
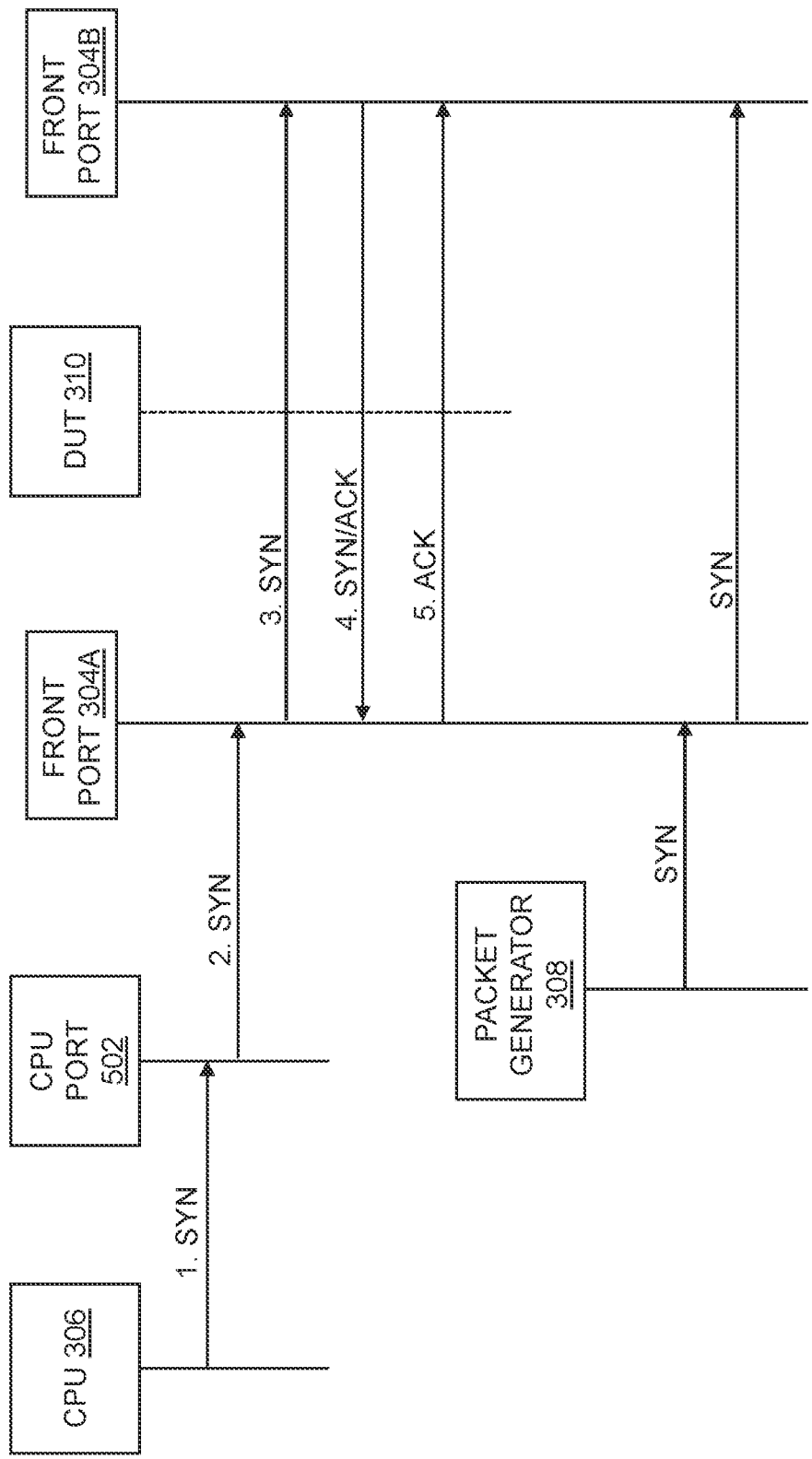
FIG. 5 is an example process flow diagram for emulating a stateful transport layer protocol, including packet retransmissions.

FIG. 5 is an example process flow diagram for emulating a stateful transport layer protocol, including packet retransmissions. As shown in FIG. 5, the DUT in this example process is configured for receiving and passing packets and may be, for example, a router, switch, or firewall. Thus, in this process, programmable switching ASIC 102 emulates a client and a server. In step 1, a SYN packet is sent from CPU 306 to a CPU port 502 in the programmable switching ASIC 102. In step 2, the SYN packet is internally distributed from CPU port 502 to front panel port 304a emulating a client. In step 3, the SYN packet is transmitted from front panel port 304a to front panel port 304b emulating a server via DUT 310. An ingress pipeline processing in programmable switching ASIC 102 transforms the SYN packet to a SYN/ACK packet. In step 4, the SYN/ACK packet is sent from front panel port 304b to front panel port 304a via DUT 310. The ingress pipeline processing transforms the SYN/ACK packet to an ACK packet. In step 5, front panel port 304a transmits the ACK packet via DUT 310 to front panel port 304b. For each concurrent connection packet transmitted, packet generator 308 generates a corresponding packet template. Programmable switching ASIC 102 checks transmission times in registers of packet database 312 to determine whether a packet timeout event occurred, which programmable switching ASIC 102 would consider the packet to have dropped. If a packet dropped, an ingress pipeline in programmable switching ASIC 102 refers to registers in packet database 312 for packet content and inputs packet content information in the packet template. The packet is then transmitted by the port of front panel ports 304 that transmitted the dropped packet.

Figure 6:
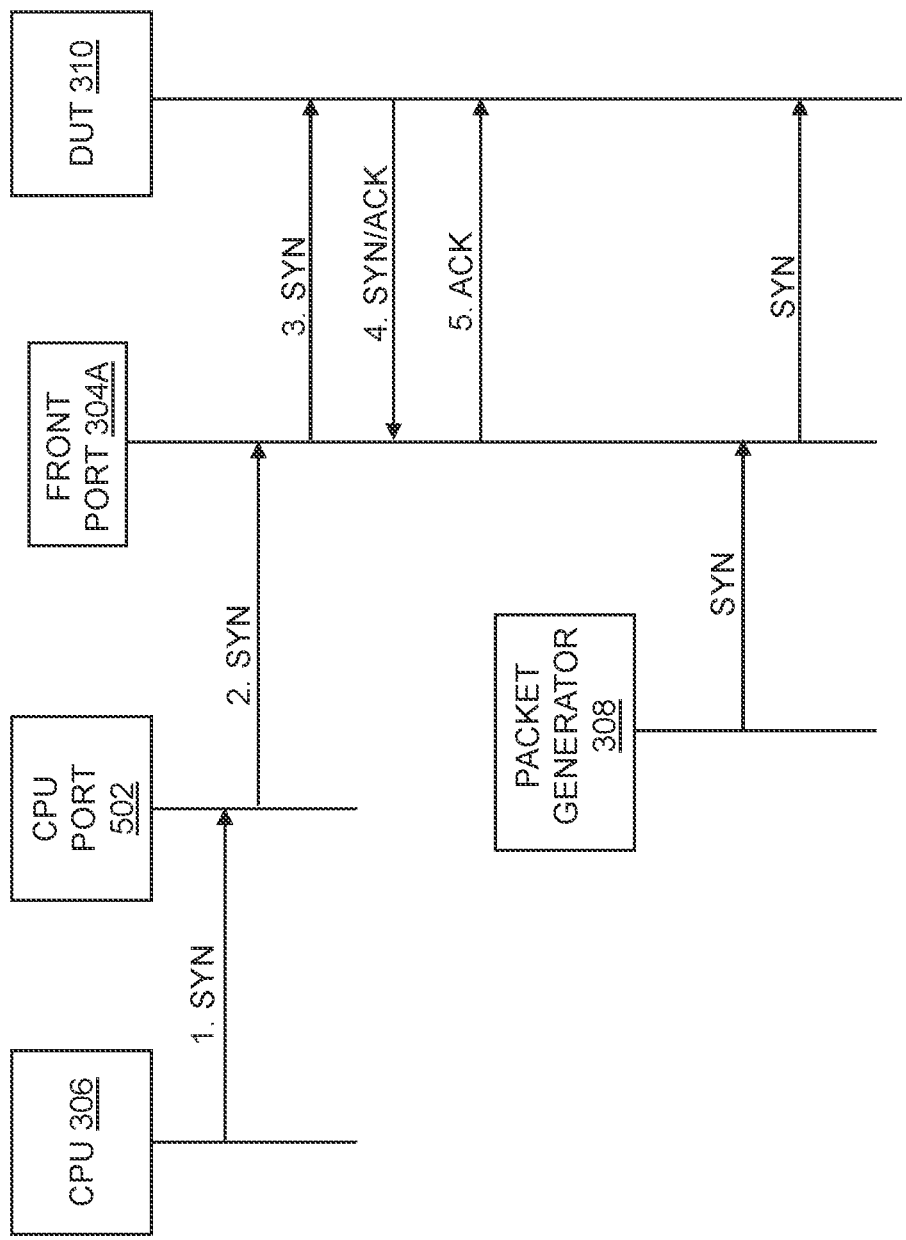
FIG. 6 is another example process flow diagram for emulating a stateful transport layer protocol, including packet retransmissions.

FIG. 6 is another example process flow diagram for emulating a stateful transport layer protocol, including packet retransmissions, wherein the DUT is a server, such as an HTTP server, and the intended recipient of packets transmitted from programmable switching ASIC 102. In this embodiment, programmable switching ASIC 102 emulates only a client and not a server. Steps 1 and 2 are similar to the process illustrated in FIG. 5, wherein a SYN packet is sent from CPU 306 to a CPU port 502 in the programmable switching ASIC 102, and the SYN packet is internally distributed from CPU port 502 to front panel port 304a emulating a client, respectively. In step 3, however, the SYN packet is transmitted from front panel port 304a to DUT 310 as the intended destination. In step 4, DUT 310 returns a SYN/ACK packet to front panel port 304a. In step 5, front panel port 304a transmits the ACK packet to DUT 310.

Figure 7:
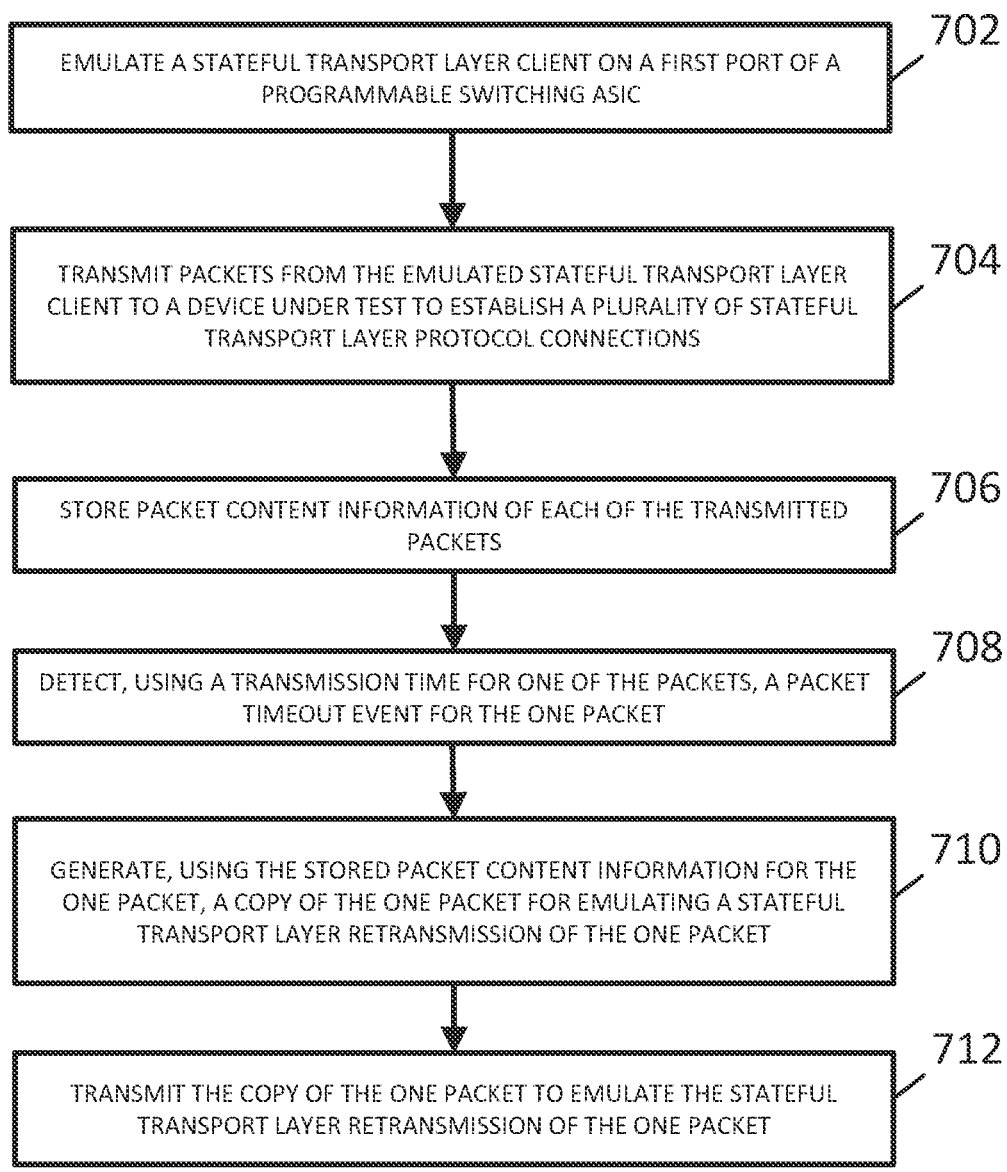
FIG. 7 is a flow diagram illustrating an example method emulating a stateful transport layer protocol, including packet retransmissions, according to an embodiment of the presently disclosed subject matter.

FIG. 7 is a flow diagram illustrating an example method 700 for emulating a stateful transport layer protocol, including packet retransmissions.

At step 702 a programmable switching application-specific integrated circuit (ASIC) emulates a stateful transport layer client on a first port of the programmable switching ASIC. The programmable switching ASIC may include a P4 programmable switching ASIC. the programmable switching ASIC may emulate a stateful transport layer server on a second port of the programmable switching ASIC. Emulating a stateful transport layer client and stateful transport layer server may include emulating a transmission control protocol (TCP) client and a TCP server using the programmable switching ASIC.

At step 704, the programmable switching ASIC transmits packets from the emulated stateful transport layer client to a device under test (DUT) to establish a plurality of stateful transport layer protocol connections. The programmable switching ASIC may transmit emulated TCP 3-way handshake packets between the TCP client and the TCP server. In embodiments where the programmable switching ASIC emulates a stateful transport layer server on a second port, transmitting packets from the emulated stateful transport layer client to a DUT may include transmitting packets to establish a plurality of stateful transport layer protocol connections between the emulated stateful transport layer client and the emulated stateful transport layer server through the DUT.

At step 706, the programmable switching ASIC stores packet content information of each of the transmitted packets. The programmable switching ASIC may store transmission times of each transmitted packet, which may be reset for a packet when the programmable switching ASIC receives an acknowledge for the corresponding transmitted packet.

At step 708, the programmable switching ASIC detects a packet timeout event for the one packet by the emulated transport layer client and using a transmission time for one of the packets. The programmable switching ASIC may detect a packet timeout event using the emulated transport layer server. The programmable switching ASIC may determine that a transmission time of the packet for which the packet timeout event occurred exceeds a threshold and detect the packet timeout event based on this determination. The programmable switching ASIC may detect a timeout of one of the 3-way TCP handshake packets.

At step 710, in response to detecting the packet timeout event for the one packet, the programmable switching ASIC generates, by a packet generator implemented in the programmable switching ASIC and using the stored packet content information for the one packet, a copy of the one packet for emulating a stateful transport layer retransmission of the one packet.

At step 712, the programmable switching ASIC transmits, by the emulated transport layer client, the copy of the one packet to emulate the stateful transport layer retransmission of the one packet. In embodiments wherein the programmable switching ASIC also emulated a server, the programmable switching ASIC may transmit the copy by the emulated transport layer server.

It will be appreciated that method 200 and method 700 are for illustrative purposes and that different and/or additional actions may be used. It will also be appreciated that various actions described herein may occur in a different order or sequence. It is understood that DUT 120 or DUT 310 may be interchangeable with a system under test.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

SUPPLEMENTAL CLAIMS

A non-transitory computer readable medium having stored thereon executable instructions embodied in the non-transitory computer readable medium that when executed by at least one processor of a computing device cause the computing device to perform steps comprising:
  receiving n traffic flows generated by at least one traffic generator, n being an integer;
  generating, using information from packets in the n traffic flows, m traffic flows, where m is an integer greater than n; and transmitting the m traffic flows to a flow destination via device under test (DUT).

A non-transitory computer readable medium having stored thereon executable instructions embodied in the non-transitory computer readable medium that when executed by at least one processor of a computing device cause the computing device to perform steps comprising:

emulating a stateful transport layer client on a first port of a programmable switching ASIC;

transmitting packets from the emulated stateful transport layer client to a device under test (DUT) to establish a plurality of stateful transport layer protocol connections;

storing, at the programmable switching ASIC, packet content information of each of the transmitted packets;

detecting, by the emulated transport layer client and using a transmission time for one of the packets, a packet timeout event for the one packet;

in response to detecting the packet timeout event for the one packet, generating, by a packet generator implemented in the programmable switching ASIC and using the stored packet content information for the one packet, a copy of the one packet for emulating a stateful transport layer retransmission of the one packet; and transmitting, by the emulated transport layer client, the copy of the one packet to emulate the stateful transport layer retransmission of the one packet.

What is claimed is:

1. A method for emulating a stateful transport layer protocol, including packet retransmissions, in a programmable switching application-specific integrated circuit (ASIC), the method comprising:

emulating a stateful transport layer client on a first port of a programmable switching ASIC;

transmitting packets from the emulated stateful transport layer client to a device under test (DUT) to establish a plurality of stateful transport layer protocol connections;

storing, at the programmable switching ASIC, packet content information of each of the transmitted packets;

detecting, by the emulated transport layer client and using a transmission time for one of the packets, a packet timeout event for the one packet;

in response to detecting the packet timeout event for the one packet, generating, by a packet generator implemented in the programmable switching ASIC and using the stored packet content information for the one packet, a copy of the one packet for emulating a stateful transport layer retransmission of the one packet; and transmitting, by the emulated transport layer client, the copy of the one packet to emulate the stateful transport layer retransmission of the one packet.

2. The method of claim 1 further comprising emulating a stateful transport layer server on a second port of the programmable switching ASIC, wherein transmitting packets from the emulated stateful transport layer client to a device under test (DUT) comprises transmitting packets to establish a plurality of stateful transport layer protocol connections between the emulated stateful transport layer client and the emulated stateful transport layer server through the DUT.

3. The method of claim 2 wherein the programmable switching ASIC includes a P4 programmable switching ASIC, wherein emulating a stateful transport layer client includes emulating a transmission control protocol (TCP) client and wherein emulating a stateful transport layer server includes emulating a TCP server using the P4 programmable switching ASIC.

4. The method of claim 3 wherein transmitting the packets to establish the stateful transport layer connections includes transmitting emulated TCP 3-way handshake packets between the TCP client and the TCP server.

5. The method of claim 4 wherein detecting the packet timeout event includes detecting a timeout of one of the 3-way TCP handshake packets.

6. The method of claim 1 wherein detecting the packet timeout event includes determining that a transmission time of the packet for which the packet timeout event occurred exceeds a threshold.

7. A system for emulating a stateful transport layer protocol, including packet retransmissions, the system comprising:

a programmable switching application-specific integrated circuit (ASIC) configured for:

emulating a stateful transport layer client on a first port of a programmable switching ASIC, transmitting packets to establish a plurality of stateful transport layer protocol connections between the emulated stateful transport layer client and the emulated stateful transport layer server through a device under test (DUT);

storing, at the programmable switching ASIC, packet content information of each of the transmitted packets;

detecting, by the emulated transport layer client or the emulated transport layer server and using a transmission time for one of the packets, a packet timeout event for the one packet;

in response to detecting the packet timeout event for the one packet, generating, by a packet generator implemented in the programmable switching ASIC and using the stored packet content information for the one packet, a copy of the one packet for emulating a stateful transport layer retransmission of the one packet; and transmitting, by the emulated transport layer client or the emulated transport layer server, the copy of the one packet to emulate the stateful transport layer retransmission of the one packet.

8. The system of claim 7 further comprising emulating a stateful transport layer server on a second port of the programmable switching ASIC, wherein transmitting packets from the emulated stateful transport layer client to a device under test (DUT) comprises transmitting packets to establish a plurality of stateful transport layer protocol connections between the emulated stateful transport layer client and the emulated stateful transport layer server through the DUT.

9. The system of claim 8 wherein the programmable switching ASIC includes a P4 programmable switching ASIC, wherein emulating a stateful transport layer client includes emulating a transmission control protocol (TCP) client and wherein emulating a stateful transport layer server includes emulating a TCP server using the P4 programmable switching ASIC.

10. The system of claim 9 wherein transmitting the packets to establish the stateful transport layer connections includes transmitting emulated TCP 3-way handshake packets between the TCP client and the TCP server.

11. The system of claim 10 wherein detecting the packet timeout event includes detecting a timeout of one of the 3-way TCP handshake packets.

12. The system of claim 7 wherein detecting the packet timeout event includes determining that a transmission time of the packet for which the packet timeout event occurred exceeds a threshold.

* * * * *